United States Patent
Ohshima

(10) Patent No.: US 7,678,855 B2
(45) Date of Patent: Mar. 16, 2010

(54) RUBBER COMPOSITION

(75) Inventor: Nobumitsu Ohshima, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 573 days.

(21) Appl. No.: 11/501,723

(22) Filed: Aug. 10, 2006

(65) Prior Publication Data

US 2007/0037919 A1     Feb. 15, 2007

(30) Foreign Application Priority Data

Aug. 10, 2005   (JP)   ............................. 2005-232127

(51) Int. Cl.
*C08K 3/04*   (2006.01)
(52) U.S. Cl. ...................... 524/495; 524/284; 524/575.5
(58) Field of Classification Search ................... 524/495
See application file for complete search history.

(56) References Cited

U.S. PATENT DOCUMENTS

| | | | |
|---|---|---|---|
| 4,853,428 A | | 8/1989 | Theodore et al. |
| 5,304,326 A | * | 4/1994 | Goto et al. .................. 252/511 |
| 6,369,151 B1 | | 4/2002 | Mizuno et al. |
| 2003/0191249 A1 | | 10/2003 | Mori et al. |
| 2005/0027060 A1 | * | 2/2005 | Yagi et al. .................... 524/493 |
| 2005/0101718 A1 | | 5/2005 | Lechtenboehmer |
| 2005/0175829 A1 | * | 8/2005 | Aoki et al. ............... 428/295.1 |

FOREIGN PATENT DOCUMENTS

| | | |
|---|---|---|
| GB | 1 295 435 A | 11/1972 |
| JP | 1-287151 A | 11/1989 |
| JP | 1-289843 A | 11/1989 |
| JP | 2000-109610 A | 4/2000 |
| JP | 2003-213040 A | 7/2003 |
| WO | WO 95/07316 A1 | 3/1995 |
| WO | WO 9632437 A1 * | 10/1996 |

OTHER PUBLICATIONS

Gary R. Hamed, Engineering with Rubber, 2nd Edition, Hanser 2001, Chapter 2, pp. 23-25 and 31.*
Niedermeier et al. "Reinforcement Mechanism in the Rubber Matrix by Active Fillers." Available online in 2002 at www.omikk.bme. hu:8080/cikkadat/bitstream/123456789/1368/1/2002_10bol38. pdf.*

* cited by examiner

*Primary Examiner*—David Wu
*Assistant Examiner*—Vu Nguyen
(74) *Attorney, Agent, or Firm*—Sughrue Mion, PLLC

(57) ABSTRACT

A rubber composition having a high hysteresis loss is provided without impairment of other physical properties, such as fracture characteristics. The rubber composition includes 100 parts by weight of a rubber component, 0.1 to 100 parts by weight of graphitized carbon material, and a lipid the amount of which is 0.02 to 0.2 times the amount of the graphitized carbon material. Preferably, the graphitized carbon material is carbon fiber grown from a vapor phase or graphitized carbon black, and the lipid is a fatty acid. Preferably, the rubber composition according to the present invention has a loss tangent tan δ in the range of 0.05 to 0.5 at a temperature of 60 degree C. after vulcanization.

6 Claims, 1 Drawing Sheet

RUBBER COMPOSITION

BACKGROUND OF THE INVENTION

1. Field of the Invention

The present invention relates to a rubber composition and more particularly to a rubber composition in which a high hysteresis loss is achieved by the modification of an additive without impairment of other physical properties, such as fracture characteristics, a method of controlling the physical properties of the rubber, and a tire using the rubber composition.

2. Description of the Related Art

Proposed techniques for imparting a high hysteresis loss to a rubber composition or proposed techniques for preparing a rubber composition having a high hysteresis loss after vulcanization include (1) the addition of a large amount of carbon black, (2) use of a polymer having a high glass transition temperature (hereinafter referred to as "Tg"), and (3) the addition of a large amount of softener.

As a technique for improving the hysteresis loss of a rubber composition, for example, Japanese Unexamined Patent Application Publication No. 2000-109610 describes a rubber composition and a pneumatic tire in which the hysteresis loss of the rubber composition is increased by the addition of a predetermined amount of polymer prepared by cationic polymerization using a Lewis acid catalyst as an initiator to a rubber component without impairment of fracture characteristics. Japanese Unexamined Patent Application Publication No. 2003-213040 describes a technique for providing a rubber composition containing a rubber component and a predetermined softener composed of an asphalt and a process oil and thereby having a high hysteresis loss and high fracture resistance.

Furthermore, in a known technique, a carbon fiber grown from a vapor phase is added to a rubber composition to improve the physical properties of the rubber composition. For example, Japanese Unexamined Patent Application Publications Nos. 1-287151 and 1-289843 describe rubber compositions in which predetermined amounts of carbon fiber grown from a vapor phase and carbon black are added to a rubber component to improve their physical properties.

However, in the case of (1) the addition of a large amount of carbon black, while the hysteresis loss is increased after vulcanization, another important characteristic, elongation, becomes deteriorated. In the case of (2) use of a polymer having a high Tg, after vulcanization, the modulus of elasticity undesirably increases and the elongation at break decreases in an operating temperature range, that is, at low temperature. In the case of (3) the addition of a large amount of softener, after vulcanization, while the hysteresis loss and the elongation at break increase, the breaking strength and the anti-setting properties become much deteriorated.

SUMMARY OF THE INVENTION

Accordingly, it is an object of the present invention to solve the problems described above and provide a rubber composition having a high hysteresis loss without impairment of other physical properties, such as fracture characteristics, a method of controlling the physical properties of the rubber composition, and a tire using the rubber composition.

As a result of extensive investigations to solve the problems, the present inventor perfected the present invention by discovering that the addition of a combination of a predetermined carbon material and a predetermined lipid to a rubber component can increase the hysteresis loss without impairment of fracture characteristics.

More specifically, a rubber composition according to the present invention contains 100 parts by weight of a rubber component, 0.1 to 100 parts by weight of graphitized carbon material per 100 parts by weight of a rubber component, and a lipid the amount of which is 0.02 to 0.2 times the amount of the graphitized carbon material.

Preferably, the graphitized carbon material is carbon fiber grown from a vapor phase or graphitized carbon black, and the lipid is a fatty acid. Preferably, the loss tangent tan δ in the present invention is in the range of 0.05 to 0.5 at a temperature of 60 degree C. after vulcanization. Preferably, a rubber composition according to the present invention contains ungraphitized carbon black the amount of which is 0.1 to 50 times the amount of the graphitized carbon material.

A method for controlling the physical properties of a rubber composition according to the present invention is a method for controlling the physical properties of a rubber composition containing a rubber component, a graphitized carbon material, and a lipid. This method includes adjusting the melting point of the lipid to control the temperature of a secondary dispersion of tan δ in the rubber composition after vulcanization.

Further, a tire according to the present invention uses the rubber composition as a tread material.

According to the present invention, the rubber composition can have a high hysteresis loss without impairment of other physical properties, such as fracture characteristics. Therefore, the tire using the rubber composition as a tread material has an improved grip property.

DESCRIPTION OF THE PREFERRED EMBODIMENTS

Figure 1:
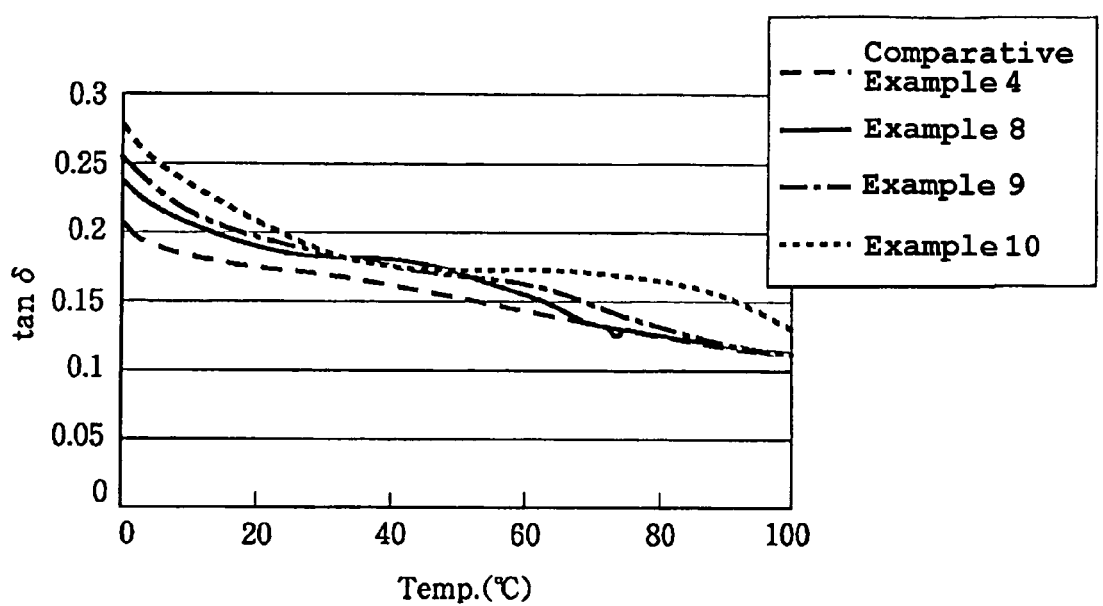
FIG. 1 is a graph illustrating tan δ as a function of temperature in Comparative Example 4 and Examples 8 to 10.

Preferred examples of the present invention will be described in detail below.

A rubber composition according to the present invention contains a rubber component, a graphitized carbon material, and a lipid. In addition to the glass transition point (primary dispersion) of a matrix rubber, the graphitized carbon material containing regularly stacked graphene sheets in a rubber component allows a secondary dispersion of loss tangent tan δ to occur (higher hysteresis loss). Furthermore, the melting point of the lipid is adjusted to control the temperature of the secondary dispersion without changing the peak temperature of the primary dispersion and without impairment of fracture characteristics.

The rubber component may be, but not limited to, at least one selected from natural rubbers and synthetic rubbers depending on the application. Synthetic rubbers include general-purpose synthetic rubbers, such as styrene-butadiene rubbers (SBRs) prepared by emulsion polymerization, styrene-butadiene rubbers prepared by solution polymerization, high cis-1,4-polybutadiene rubbers (BRs), low cis-1,4-polybutadiene rubbers, and high cis-1,4-polyisoprene rubbers (IRs), special diene rubbers, such as nitrile rubbers, hydrogenated nitrile rubbers, and chloroprene rubbers, special olefinic rubbers, such as ethylene-propylene rubbers, butyl rubbers, halogenated butyl rubbers, acrylic rubbers, and chlorosulfonated polyethylenes, and special rubbers, such as hydrin rubbers, fluorocarbon rubbers, polysulfide rubbers, and urethane rubbers.

Examples of the graphitized carbon material include graphitized carbon black, carbon fiber grown from a vapor phase, and graphite. The carbon fiber grown from a vapor phase may have an appropriate fiber diameter, fiber length, and aspect ratio as desired and, for example, have an average diameter of about 0.01 to 0.4 micrometer, particularly about 0.07 to 0.3 micrometer and an average length of about 0.5 to 30 micrometers, particularly about 1.5 to 25 micrometers. Preferably, the carbon fiber grown from a vapor phase has a specific surface area of 5 to 50 m$^2$/g, particularly 8 to 30 m$^2$/g. Preferred examples of a commercial carbon fiber include VGCF (trade name) produced by a gas phase method from Showa Denko K.K.

The amount of such a graphitized carbon material is 0.1 to 100 parts by weight and preferably 1 to 50 parts by weight per 100 parts by weight of rubber component. An excessive amount of graphitized carbon material decreases the tensile stress and the breaking strength. Too small an amount of graphitized carbon material provides no secondary dispersion of tan δ. Both are undesirable.

Examples of the lipid includes, but not limited to, fatty acids and waxes. The amount of the lipid is 0.02 to 0.2 and more preferably 0.02 to 0.1 times the amount of the graphitized carbon material. An excessive amount of lipid may cause blooming. Too small an amount of graphitized carbon material provides no secondary dispersion of tan δ. Both are undesirable.

A rubber composition according to the present invention may contain various additives commonly used in the rubber industry as appropriate, provided that they do not inhibit the effects of the present invention. Examples of the additives include inorganic fillers, such as carbon black, silica, and calcium carbonate, coupling agents, such as silane coupling agents, softeners, vulcanizing agents, such as sulfur, vulcanization accelerators, such as dibenzothiazyl disulfide, antioxidants, such as N-cyclohexyl-2-benzothiazyl sulfenamide and N-oxydiethylene benzothiazyl sulfenamide, zinc oxide, stearic acid, antiozonants, blowing agents, and foaming aids. These additives may be used alone or in combination. Among these, ungraphitized carbon black the amount of which is 0.1 to 50 times the amount of graphitized carbon material is preferred. These additives may be commercial products.

In a rubber composition according to the present invention having such a composition, the loss tangent tan δ can be adjusted to 0.05 to 0.5 at a temperature of 60 degree C. after vulcanization.

A rubber composition according to the present invention may be prepared by kneading, warming, and extrusion of the components described above using proper apparatuses, conditions, and procedures. A rubber composition according to the present invention may suitably be applied to various rubber products, such as tires. In particular, a tire using the rubber composition as a tread material has an improved grip properties.

In kneading, conditions, such as the charge volume in a kneader, the rotation speed of a rotor, the ram pressure, the kneading temperature, the kneading time, and the type of kneader, may be selected appropriately. The kneader may be an open kneader, such as a rolling mill, or an internal mixer, such as a Banbury mixer. Commercial kneaders may suitably be used.

In warming or extrusion, conditions, such as the warming or extrusion time and the type of warming apparatus or extruder, may also be selected appropriately. Commercial warming apparatuses or extruders may suitably be used.

According to the present invention, a method for controlling the physical properties of a rubber composition containing a rubber component, a graphitized carbon material, and a lipid includes adjusting the melting point of the lipid to control the temperature of a secondary dispersion of tan δ in the rubber composition after vulcanization. According to this method, the temperature of a secondary dispersion of the rubber composition can be controlled without impairment of fracture characteristics.

The present invention will be described in more detail with reference to the following examples.

Examples 1 to 10 and Comparative Examples 1 to 4

Rubber compositions of examples and comparative examples were prepared from rubber compounds illustrated in Tables 1 to 3. The rubber compositions were vulcanized at a temperature of 150 degree C. (NR) or 155 degree C. (SBR) for $T_{0.9} \times 1.5$ hours. The tensile strength (Tb), the elongation at break (Eb), and the loss tangent tan δ at a temperature of 60 degree C. were determined for the vulcanized rubbers by the methods described below. The results were described in Tables 1 to 3, together with each temperature of a primary dispersion and a secondary dispersion of the rubber compositions.

(Tensile Strength and Elongation at Break)

A tensile test was performed according to JIS K 6251. The tensile strength (Tb) and the elongation at break (Eb) were determined for the vulcanized rubbers.

(Loss Tangent)

A viscoelastometer (ARES) from TA Instruments Japan was used to measure loss tangent (tan δ) at a frequency of 1.5 Hz, a strain of 0.1%, and a temperature of 60 degree C.

TABLE 1

|  |  | Comparative Example 1 | Comparative Example 2 | Comparative Example 3 | Example 1 | Example 2 |
|---|---|---|---|---|---|---|
| Rubber compound | NR*[1] | 100 | 100 | 100 | 100 | 100 |
|  | SBR*[2] | — | — | — | — | — |
|  | HAF carbon black | 50 | 70 | 50 | 25 | — |
|  | VGCF*[3] | — | — | — | 25 | 50 |
|  | G-HAF*[4] | — | — | — | — | — |
|  | Decanoic acid | — | — | — | — | — |
|  | Stearic acid | 2 | 2 | 2 | 2 | 2 |
|  | Cerotic acid | — | — | — | — | — |
|  | Aromatic oil | — | — | 37.5 | — | — |
|  | Antioxidant*[5] | 1 | 1 | 1 | 1 | 1 |

TABLE 1-continued

|  |  | Comparative Example 1 | Comparative Example 2 | Comparative Example 3 | Example 1 | Example 2 |
|---|---|---|---|---|---|---|
|  | Zinc white | 3 | 3 | 3 | 3 | 3 |
|  | Vulcanization accelerator A*6 | 1 | 1 | 1 | 1 | 1 |
|  | Vulcanization accelerator B*7 | — | — | — | — | — |
|  | Sulfur | 1.5 | 1.5 | 1.5 | 1.5 | 1.5 |
| Physical properties | Tb (MPa) | 26 | 26 | 20 | 25 | 22 |
|  | EB (%) | 417 | 269 | 590 | 476 | 518 |
|  | tan δ (60° C.) | 0.090 | 0.132 | 0.133 | 0.135 | 0.147 |
|  | Temperature of primary dispersion (° C.) | −49 | −49 | −45 | −49 | −49 |
|  | Temperature of secondary dispersion (° C.) | none | none | none | 55 | 57 |

*1 NR: Product number RSS
*2 SBR: JSR, Product number 1500
*3 Carbon fiber grown from a vapor phase: Showa Denko K.K, carbon fiber VGCF (trade name)
*4 Graphitized carbon black: Tokai Carbon Co., Ltd., product number #3855
*5 Antioxidant: N-(1,3-dimethylbutyl)-N'-phenyl-p-phenylenediamine
*6 Vulcanization accelerator A: N-cyclohexyl-2-benzothiazyl sulfenamide
*7 Vulcanization accelerator B: N-t-butyl-2-benzothiazyl sulfenamide

TABLE 2

|  |  | Example 3 | Example 4 | Comparative Example 4 | Example 5 | Example 6 |
|---|---|---|---|---|---|---|
| Rubber compound | NR*1 | 100 | 100 | — | — | — |
|  | SBR*2 | — | — | 100 | 100 | 100 |
|  | HAF carbon black | 25 | — | 60 | — | — |
|  | VGCF*3 | — | — | — | — | — |
|  | G-HAF*4 | 25 | 50 | — | 60 | 60 |
|  | Decanoic acid | — | — | — | 3 | — |
|  | Stearic acid | 2 | 2 | 3 | — | 3 |
|  | Cerotic acid | — | — | — | — | — |
|  | Aromatic oil | — | — | — | — | — |
|  | Antioxidant*5 | 1 | 1 | 1 | 1 | 1 |
|  | Zinc white | 3 | 3 | 3 | 3 | 3 |
|  | Vulcanization accelerator A*6 | 1 | 1 | — | — | — |
|  | Vulcanization accelerator B*7 | — | — | 1 | 1 | 1 |
|  | Sulfur | 1.5 | 1.5 | 1.75 | 1.75 | 1.75 |
| Physical properties | Tb (MPa) | 26 | 25 | 27 | 25 | 26 |
|  | EB (%) | 510 | 609 | 447 | 663 | 669 |
|  | tan δ (60° C.) | 0.140 | 0.178 | 0.143 | 0.149 | 0.165 |
|  | Temperature of primary dispersion (° C.) | −49 | −49 | −35 | −35 | −35 |
|  | Temperature of secondary dispersion (° C.) | shoulder | shoulder | none | shoulder | shoulder |

TABLE 3

|  |  | Example 7 | Example 8 | Example 9 | Example 10 |
|---|---|---|---|---|---|
| Rubber compound | NR*1 | — | — | — | — |
|  | SBR*2 | 100 | 100 | 100 | 100 |
|  | HAF carbon black | — | — | — | — |
|  | VGCF*3 | — | 60 | 60 | 60 |
|  | G-HAF*4 | 60 | — | — | — |
|  | Decanoic acid | — | 3 | — | — |
|  | Stearic acid | — | — | 3 | — |
|  | Cerotic acid | 3 | — | — | 3 |
|  | Aromatic oil | — | — | — | — |
|  | Antioxidant*5 | 1 | 1 | 1 | 1 |
|  | Zinc white | 3 | 3 | 3 | 3 |
|  | Vulcanization accelerator A*6 | — | — | — | — |
|  | Vulcanization accelerator B*7 | 1 | 1 | 1 | 1 |
|  | Sulfur | 1.75 | 1.75 | 1.75 | 1.75 |
| Physical properties | Tb (MPa) | 24 | 14 | 14 | 13 |
|  | EB (%) | 664 | 736 | 706 | 708 |
|  | tan δ (60° C.) | 0.192 | 0.152 | 0.165 | 0.172 |

TABLE 3-continued

|  | Example 7 | Example 8 | Example 9 | Example 10 |
|---|---|---|---|---|
| Temperature of primary dispersion (° C.) | −35 | −35 | −35 | −35 |
| Temperature of secondary dispersion (° C.) | shoulder | 45 | 58 | 78 |

As illustrated in Tables 1 to 3, rubber compositions of the examples each containing predetermined amounts of graphitized carbon material and lipid in the rubber component had larger tan δ values than those of the rubber compositions of the comparative examples only containing ungraphitized carbon black as carbon material. In addition, the rubber compositions of the examples had substantially the same tensile strengths and elongations at break as the rubber compositions of the comparative examples. This is also apparent from a graph in FIG. 1 illustrating tan δ as a function of temperature in Examples 8 to 10 and Comparative Example 4, which had the same composition as Examples 8 to 10 other than a carbon material.

What is claimed is:

1. A rubber composition comprising:
    0.1 to 100 parts by weight of graphitized carbon material per 100 parts by weight of a rubber component; and
    a lipid the amount of which is 0.02 to 0.2 times the amount of the graphitized carbon material,
    wherein the graphitized carbon material is carbon fiber grown from a vapor phase or graphitized carbon black.

2. The rubber composition according to claim 1, wherein the lipid is a fatty acid.

3. The rubber composition according to claim 1, wherein the rubber composition has a loss tangent tan δ in the range of 0.05 to 0.5 at a temperature of 60 degree C. after vulcanization.

4. The rubber composition according to claim 1, further comprising ungraphitized carbon black the amount of which is 0.1 to 50 times the amount of the graphitized carbon material.

5. A tire wherein the rubber composition according to claim 1 is used as a tread material.

6. A rubber composition comprising:
    0.1 to 100 parts by weight of graphitized carbon material per 100 parts by weight of a rubber component; and
    a lipid the amount of which is 0.02 to 0.2 times the amount of the graphitized carbon material,
    wherein the graphitized carbon material is carbon fiber grown from a vapor phase.

* * * * *